United States Patent [19]
Rabe

[11] Patent Number: 4,694,677
[45] Date of Patent: Sep. 22, 1987

[54] ELONGATED TUBE EXPANDER TOOL

[75] Inventor: George B. Rabe, Sparta, N.J.

[73] Assignee: Foster Wheeler Energy Corporation, Livingston, N.J.

[21] Appl. No.: 831,888

[22] Filed: Feb. 24, 1986

[51] Int. Cl.$^4$ ............................................. B21D 41/02
[52] U.S. Cl. .................................... 72/393; 29/157.4; 29/523; 29/727; 29/283.5
[58] Field of Search ...................... 29/283.5, 523, 727, 29/157.4; 72/393

[56] References Cited

U.S. PATENT DOCUMENTS

| 688,429 | 12/1901 | Monroe | 72/393 |
|---|---|---|---|
| 691,446 | 1/1902 | Colby | 72/393 |
| 1,039,948 | 10/1912 | Hunter | 72/393 |
| 1,049,173 | 12/1912 | Turek | 72/393 |
| 2,319,216 | 5/1943 | Dewald | 72/393 |
| 3,345,730 | 10/1967 | Laverty | 72/393 X |
| 3,583,388 | 4/1986 | Hogenhout | 72/393 |
| 3,829,948 | 8/1974 | Miller et al. | 29/727 |

FOREIGN PATENT DOCUMENTS 1309708  3/1973  United Kingdom .................. 72/393

Primary Examiner—Charlie T. Moon
Attorney, Agent, or Firm—Marvin A. Naigur; Martin Smolowitz

[57] ABSTRACT

An elongated tube expander tool and method for its use for remotely expanding a tube end to provide a close fit in an existing tube, such as before welding the tube end to the existing tube. The expander tool comprises an elongated central shaft attached to a cylinder which is attached to a collet having multiple expandable fingers. The cylinder contains a slidable front piston connected to a mandrel located within the collet, so that when the piston is pressurized and moved forward the multiple fingers are expanded radially outwardly within the tube end. In use, the tool is inserted into a replacement tube until a front shoulder of the tool housing contacts the replacement tube end portion to be expanded. The front piston is then pressurized and the mandrel forced axially forward through the collet so as to expand the collet fingers, which action expands the tube end firmly against the existing tube suitable for a weld to be reliably made between the closely fitting tubes. The rear piston is then pressurized and pulls the collet fingers free from the expanded joint, after which the tool is removed.

9 Claims, 3 Drawing Figures 4,694,677

ELONGATED TUBE EXPANDER TOOL

BACKGROUND OF INVENTION

This invention pertains to remote expansion of tube end joints such as prior to welding. It pertains particularly to an elongated tube expander tool and method for remotely expanding tube ends to provide a close fit in mating tubes prior to making a remote weld joint inside the tubes.

In steam generators for nuclear power plants, bundles of U-shaped heat exchanger tubes are usually provided which are welded into a relatively thick tube sheet. During operation of such steam generators over an extended period of time, such as 10 years or more, a corrosive sludge material forms and accumulates on the inner upper surface of the tube sheet. This accumulated sludge material causes corrosion of the heat exchanger tubes to an extent of potential or actual tube failure. To correct this serious problem without undesirable disassembly or replacement of the heat exchanger, it is necessary to remove the old deteriorated tube end portions from the tube sheet and replace them with new tube portions which are positioned and welded pressure-tightly into place, without need to remove and dismantle the entire heat exchanger assembly. However, because of the remote and relatively inaccessible location of the tubes and the radioactive environment which is usually involved, such tube replacement is very difficult to accomplish reliably and safely. Thus, providing a suitable solution to this tube replacement problem by using remotely operated tube removal and replacement apparatus and preparation of the replacement tube joint in the existing tube ends for reliable seam welding has been needed, particularly for heat exchangers used in the nuclear power industry, and has led to the present invention.

SUMMARY OF INVENTION

This invention provides an elongated tube expander tool assembly and method for its use for remotely expanding a replacement tube end portion into an existing tube in relatively inaccessible locations to provide a close radial fit between the mating tubes. The tube expander tool according to the invention comprises an elongated central shaft which has a cylinder attached to its forward end, and attached to the cylinder is a collet having multiple fingers which are radially movable at their forward ends. The tool cylinder contains an axially movable front piston having attached to its forward end a cylindrical shaped tapered mandrel. The tool central shaft contains a central elongated tube having a pressure connection for pressurizing the rear end of the piston to axially drive the mandrel forward to expand the collet fingers. The central shaft has attached at its rear end and annular retractor piston slidable within a retractor housing which when pressurized can release the tool fingers from an expanded replacement tube end.

During use of the elongated tube expander tool, the front portion is inserted into a remotely located replacement tube until the forward fingers end of the collet is located within the tube reduced diameter portion to be expanded. Then, the rear end of the front piston is pressurized by a hydraulic fluid supplied through the central tube and the front piston and mandrel are forced forward in the collet, so as to expand radially outwardly the collet multiple fingers and thereby expand the tube end firmly into an existing mating tube to provide a close fit therebetween. After such tube end expansion, the collet is pulled free of the expanded tube end by pressurizing the annular retractor piston at the rear end of the tool. The expander tool is then withdrawn from the tube.

The present invention advantageously provides an expander tool assembly and method so that a replacement tube end can be remotely expanded conveniently and reliably into an existing tube to permit making reliable welds therebetween, such as for remote replacement of tube ends in heat exchangers for nuclear power plants.

DESCRIPTION OF INVENTION

Figure 1:
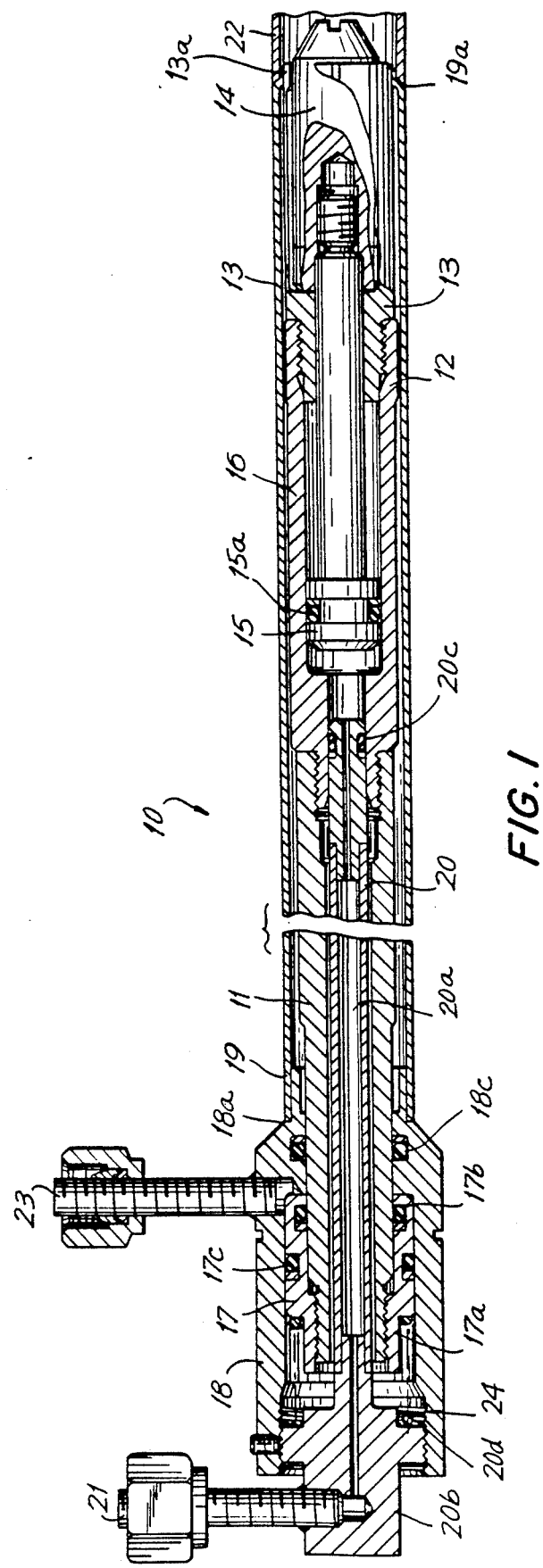
FIG. 1 shows a cross-sectional view of the tube expander tool assembly according to the present invention, the tool being positioned within a replacement tube to be expanded.

The tube expander tool will now be described in more detail first with reference to FIG. 1. As generally shown by FIG. 1, the expander tool assembly 10 has an elongated central shaft portion 11 and an expandable forward end portion 12 rigidly attached to the shaft 11. The forward portion 12 includes a collet 13 rigidly attached to a cylinder 16 and having multiple fingers 13a, and a mandrel 14 which is concentrically located and axially movable within the collet 13 by a piston 15 rigidly attached to the mandrel 14 and slidable in the cylinder 16. The mandrel 14 is tapered so that its diameter at its rear end is slightly larger than its front end diameter, preferably by 0.015–0.040 inch on diameter.

The central shaft 11 is attached at its rear end by suitable thread means to an annular retractor piston 17, which slidably operates within a retractor housing 18. The mating threads 17a connecting the retractor piston 17 onto central shaft 11 provide a means for lengthwise adjustment of the expander tool 10, so that when a replacement tube 19 is bottomed on the retractor housing shoulder 18a, the forward end of the collet multiple fingers 13a are properly located under the replacement tube swaged weld joint end 19a, which is swaged radially inwardly so as to fit within existing mating tube 22. Inner annular seal ring 17b and outer seal ring 17c are provided on piston 17 to seal it against shaft 11 and cylinder 18, respectively. Seal ring 18c is provided between the housing 18 and shaft 11.

Fluid pressure is applied to the front piston 15 having seal ring 15a through a passage 20a in central tube sub-assembly 20, which at its forward end, the seal 20c is inserted into the adjacent end of cylinder 16, and at the tube rear end is attached to retractor housing end fitting 20b. This rear fitting 20b is threaded into the rear end of housing 18 and includes rear port 21 connected to provide pressure to the passageway 20a in central tube 20. Fluid pressure is applied to retractor piston 17 at front port 23 attached to the housing 18, which pressure will move the retractor piston 17 rearward as needed to pull the collet fingers 13a free and release them from an expanded joint end 19a of tube 19. The required reactive force is applied to the replacement tube 19 at its rear end by housing shoulder 18a.

Figure 2:
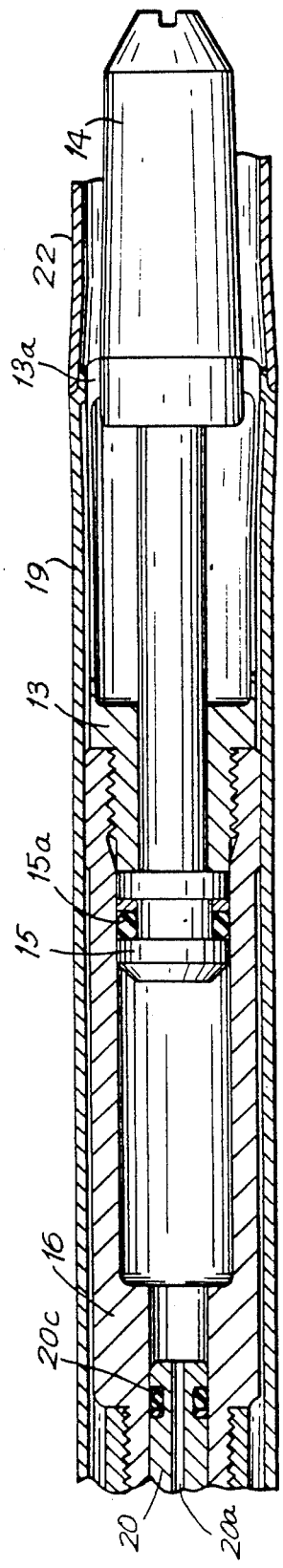
FIG. 2 shows a cross-sectional view of the forward portion of the tube expansion tool according to the present invention, the tool mandrel being shown in a forward position after it has been actuated to expand a collet and replacement tube end.

When using the expander tool assembly 10 for expanding tube end 19a, the forward end portion 12 is inserted into the replacement tube 19, which is already in place with end 19a inserted into tube 22 of a heat exchanger. Should 18a of the tool retractor housing 18 is bottomed on the tube 19 rear end. Fluid pressure is then applied through rear port 21 and central tube subassembly 20 against the piston 15, so that piston 15 drives the tapered mandrel 14 forward within collet 13. This movement of mandrel 14 expands the collet fingers 13a against the replacement tube end 19a and forces tube end 19a into firm engagement with the existing mating tube end 22. This configuration of the forward end portion of the tube expander tool 10 and the resulting expanded weldable joint 19a are shown in FIG. 2.

Figure 3:
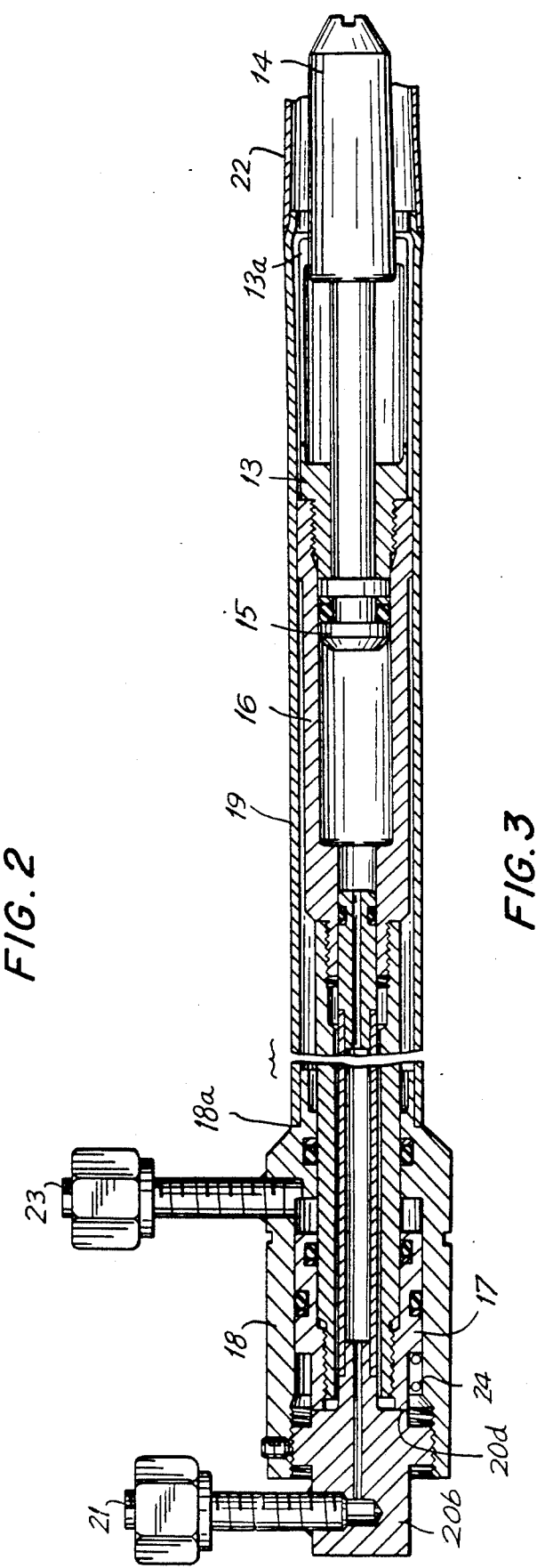
FIG. 3 shows a cross-sectional view of the tube expander tool shown after the tool collet has been pulled free of the expanded replacement tube end.

Following expansion of the replacement tube end 19a into tube 22, the tool 10 is released from its firm engagement with tube 19 by pressurizing at front port 23, as is shown in FIG. 3. Fluid pressure is applied at front port 23 against the retractor piston 17 and moves piston 17 rearward against compression spring 24 and pulls the collet fingers 13a free from the expanded joint end 19a of tube 19. The required reactive force is applied to the replacement tube 19 at its rear end by retractor housing shoulder 18a. This pressurization moves piston 17 rearward and releases the collet fingers 13a from their engagement with the replacement tube end 19a. The rearward motion is limited by movement of the retractor piston 17, which bottoms on the central tube assembly nut shoulder 20d.

FIG. 3 shows the tube expander tool 10 similar to FIG. 1 except with the piston 17, cylinder 16 and collet 13 in their retracted position, in which position the tool 10 can be readily removed from the expanded tube 19. Front piston 15 and mandrel 14 are shown remaining in a forward position.

When fluid pressure is removed from front port 23, spring 24 will return the retractor piston 17 to its original forward position as shown in FIG. 1. Also, after pressure is removed from rear port 21, the front piston 15 can be reset to its original rearward position by manually pushing the mandrel 14 back to its rearward position relative to collet 13, as is shown in FIG. 1.

This invention will be better understood with reference to the following example of construction and operations of a tube expander tool assembly for remotely expanding a tube end into an existing tube, and the example which should not be construed as limiting the scope of the invention.

EXAMPLE

A typical elongated tube expander tool having characteristics as summarized in the table below was constructed and used in remotely expanding a replacement tube end in a heat exchanger.

| Tool length, in. | 36 |
|---|---|
| Tool cylinder outside diameter, in. | 0.760 |
| Tube inner diameter, in. | 0.775 |
| Mandrel rear end diameter increase, in. | 0.020–0.030 |
| Hydraulic pressure to tool piston, psig | 7000 |
| Axial movement of mandrel, in. | 1.25 |
| Increase in the tube inner diameter, in. | 0.020–0.030 |

By use of the tool of the present invention, the replacement tube end is expanded firmly into the existing tube suitable for subsequently making a reliable pressure-tight seal weld in the tube.

Although the present invention has been described broadly and in terms of a preferred embodiment, it should be understood that modification and variations can be made to the invention, which is defined by the following claims.

I claim:
1. An elongated tube expander tool for expanding a tube end at a remote location, said tool comprising:
   (a) an elongated central shaft adapted for being inserted into a tube, said shaft being attached at its forward end to a cylinder containing a front piston axially movable in the cylinder forward end portion;
   (b) a collet attached to the forward end of said cylinder, said collet having multiple radially expandable fingers at its forward end;
   (c) a cylindrical-shaped mandrel having an inwardly tapered front end and a rear end rigidly attached to the forward end of said piston and adapted to be slidably received in said collet fingers;
   (d) a retractor piston threadably attached to the rear end of said central shaft, said retractor piston being slidable within a retractor housing; and
   (e) an elongated tube centrally disposed within said shaft and said retractor piston, the tube being adapted for supplying fluid pressure from said housing to the rear end of said front piston, whereby said mandrel can be forced forward into said collet fingers so as to radially expand the fingers and thereby radially expand the tube end.

2. A tube expander tool according to claim 1, whereas said housing has a pressurizable fitting attached at its rear end for pressurizing the front piston.

3. A tube expander tool according to claim 1, wherein said retractor piston is annular-shaped and encircles said elongated tube within said housing.

4. A tube expansion tool according to claim 1, wherein said retractor piston is threadably connected to said central shaft so as to provide adjustment of the tool length.

5. A tube expander tool according to claim 1, wherein said housing and retractor piston has a compression spring means located between the piston rear end and a rear end fitting.

6. A tube expander tool according to claim 5, wherein said rear fitting is threadably attached to said housing.

7. A tube expander tool according to claim 1, wherein said mandrel is tapered to have a larger diameter at its rear end, so that when the tool front portion is inserted into a tube said multiple fingers are expanded radially outwardly in firm contact with the tube inner wall.

8. A tube expander tool according to claim 7, wherein said mandrel diameter at its rear end is 0.015–0.040 inch larger than at its front end.

9. An elongated tube expander tool assembly for expanding a tube end at a remote location prior to welding the tube, said tool comprising:
   (a) an elongated central shaft adapted for being inserted into a tube, said shaft being attached at its forward end to a cylinder containing a front piston axially movable in the cylinder forward end portion;
(b) a collet attached to the forward end of said cylinder, said collet having multiple radially expandable fingers at its forward end;
(c) a cylindrical-shaped mandrel having an inwardly tapered portion adjacent a front end, a beveled end, and a rear end rigidly attached to the forward end of said piston and adapted to be slidably received in said collet fingers:
(d) a retractor piston threadably attached to the rear end of said central shaft, said retractor piston being slidable within a retractor housing, and having a compression spring provided between said retractor piston and a rear end fitting threadably attached to said housing; and
(e) an elongated tube centrally disposed within said shaft and said retractor piston, said housing having a fluid pressure connection at its rear end for supplying pressure through said tube to the rear end of said front piston, whereby said mandrel can be pressed forward into said collet fingers so as to radially expand the collet fingers and thereby radially expand the tube end portion.

* * * * *